United States Patent
Boog et al.

(10) Patent No.: US 10,598,102 B2
(45) Date of Patent: Mar. 24, 2020

(54) DUEL-FUEL INJECTOR, INTERNAL COMBUSTION ENGINE HAVING SUCH A DUAL-FUEL INJECTOR, AND METHOD FOR OPERATING SUCH AN INTERNAL COMBUSTION ENGINE

(71) Applicant: MTU FRIEDRICHSHAFEN GMBH, Friedrichshafen (DE)

(72) Inventors: Manuel Boog, Aulendorf (DE); Wolfgang Fimml, Hörbranz (AT)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 154 days.

(21) Appl. No.: 16/066,415

(22) PCT Filed: Jan. 20, 2017

(86) PCT No.: PCT/EP2017/000072
§ 371 (c)(1),
(2) Date: Jun. 27, 2018

(87) PCT Pub. No.: WO2017/129355
PCT Pub. Date: Aug. 13, 2017

(65) Prior Publication Data
US 2018/0363568 A1 Dec. 20, 2018

(30) Foreign Application Priority Data
Jan. 29, 2016 (DE) .................. 10 2016 201 428

(51) Int. Cl.
*F02B 3/00* (2006.01)
*F02D 19/06* (2006.01)
(Continued)

(52) U.S. Cl.
CPC ......... *F02D 19/0694* (2013.01); *F02D 19/10* (2013.01); *F02M 21/0263* (2013.01); *Y02T 10/32* (2013.01); *Y02T 10/36* (2013.01)

(58) Field of Classification Search
CPC . F02D 19/0694; F02D 19/10; F02M 21/0263; F02M 61/045; F02M 61/18;
(Continued)

(56) References Cited

U.S. PATENT DOCUMENTS 4,463,568 A 8/1984 Willis
5,067,467 A * 11/1991 Hill ..................... F02B 23/0672
123/497

(Continued)

FOREIGN PATENT DOCUMENTS

DE 102013017853 A1 4/2015
DE 102013022260 B3 5/2015
(Continued)

*Primary Examiner* — Hung Q Nguyen
(74) *Attorney, Agent, or Firm* — Lucas & Mercanti, LLP; Klaus P. Stoffel

(57) ABSTRACT

A dual-fuel injector for an internal combustion engine, including a first injection device for injecting a first fuel and at least one second injection device, arranged radially outward from the first injection device, for injecting a second fuel, wherein the second fuel is different from the first fuel, and further including a first connection for supplying the first fuel and a second connection for supplying the second fuel. The first connection is fluidically connected to the first injection device in order to supply the gaseous first fuel and the second connection is fluidically connected to the second injection device in order to supply the liquid second fuel.

11 Claims, 1 Drawing Sheet

(51) Int. Cl.
*F02M 21/02* (2006.01)
*F02D 19/10* (2006.01)

(58) Field of Classification Search
CPC ........... F02M 61/1806; F02M 61/1886; F02M 61/1893; Y02T 10/36; Y02T 10/32
See application file for complete search history.

(56) References Cited

U.S. PATENT DOCUMENTS

| | | | |
|---|---|---|---|
| 9,181,886 B2 * | 11/2015 | Grant | F02D 19/0694 |
| 9,803,564 B2 | 10/2017 | Kalenborn | |
| 9,856,838 B2 | 1/2018 | Kalenborn | |
| 9,903,325 B2 | 2/2018 | Kalenborn | |
| 9,926,861 B2 | 3/2018 | Kalenborn | |
| 2007/0169741 A1 * | 7/2007 | Vachon | F02B 3/06 |
| | | | 123/294 |
| 2012/0204835 A1 * | 8/2012 | Kim | F02M 63/0225 |
| | | | 123/456 |
| 2013/0319373 A1 * | 12/2013 | Brown | F02M 43/04 |
| | | | 123/456 |

FOREIGN PATENT DOCUMENTS

| | | |
|---|---|---|
| DE | 102014010716 A1 | 1/2016 |
| DE | 102014010717 A1 | 1/2016 |
| EP | 0778410 A1 | 6/1997 |

\* cited by examiner

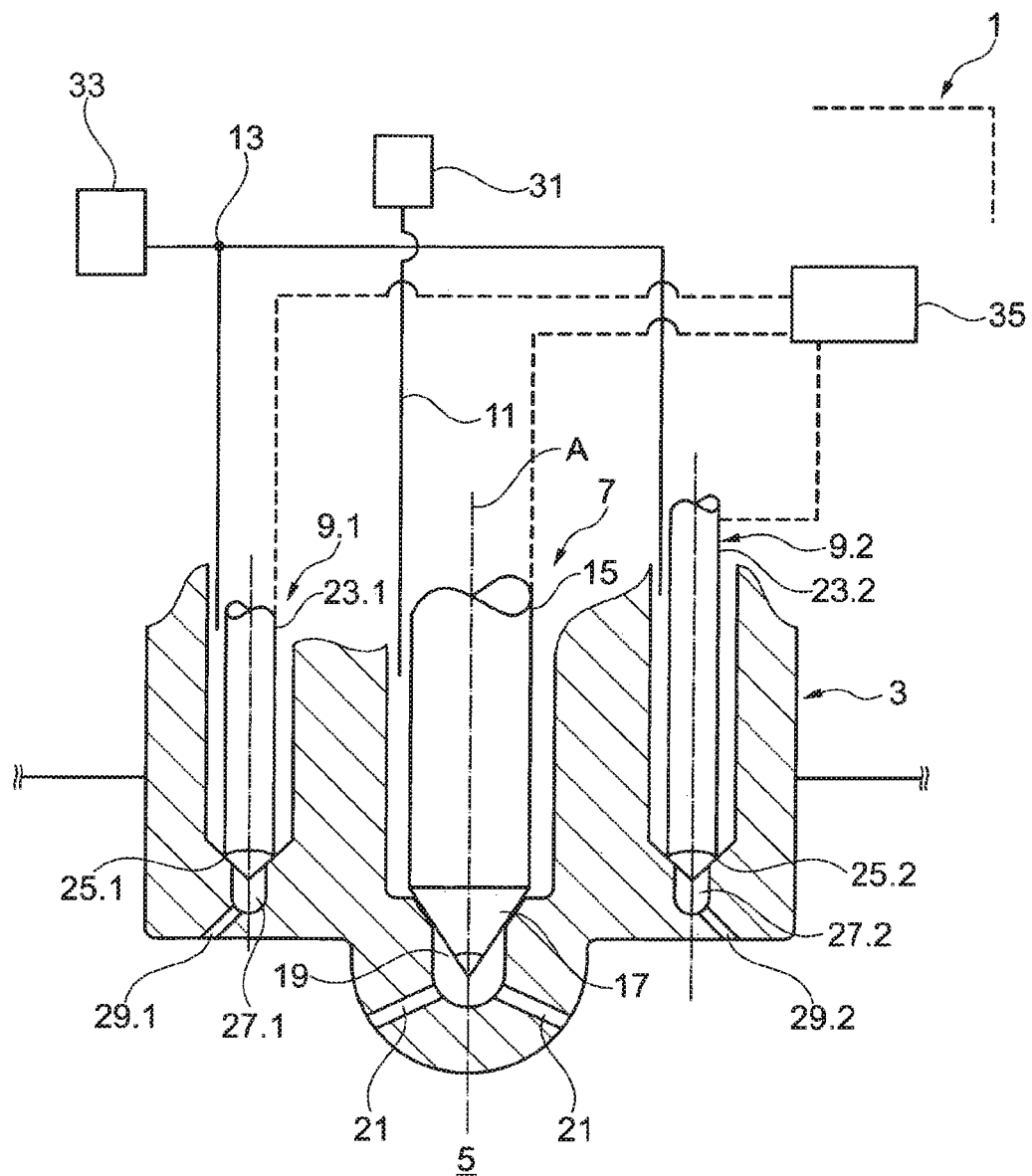

DUEL-FUEL INJECTOR, INTERNAL COMBUSTION ENGINE HAVING SUCH A DUAL-FUEL INJECTOR, AND METHOD FOR OPERATING SUCH AN INTERNAL COMBUSTION ENGINE

CROSS-REFERENCE TO RELATED APPLICATIONS

The present application is a 371 of International application PCT/EP2017/000072, filed Jan. 20, 2017, which claims priority of DE 10 2016 201 428.5, filed Jan. 29, 2016, the priority of these applications is hereby claimed and these applications are incorporated herein by reference.

BACKGROUND OF THE INVENTION

The invention concerns a dual-fuel injector for an internal combustion engine, an internal combustion engine with such a dual-fuel injector, and a method for operating such an internal combustion engine.

Gaseous fuels are gaining importance in the large engine sector, in particular for stationary power-generating engines. In particular, because of its excellent availability and favorable emission potential especially in comparison with diesel fuel, natural gas is ideal for economic and environmentally-friendly engine operation. In gas engines which work on the diesel method (compression ignition), normally a small quantity of diesel is required as a starting aid for the subsequent gas diffusion combustion. The injection jet profiles of the two fuel systems (diesel and gas) should be oriented symmetrically in order to achieve a maximum overlap, in particular clearly assignable, of the two spray patterns. For this, dual-fuel injectors are known which have a first injection device for injection of a first fuel, wherein at least one second injection device is provided, arranged radially outwardly from the first injection device, for injection of a second fuel, wherein the second fuel and the first fuel are different. In particular, it is usual for a fuel gas to be used as the second fuel, wherein the first fuel is an ignition oil, preferably diesel. A first port is provided for supplying this first fuel, and a second port is provided for supplying the second fuel. A dual-fuel injector in which a plurality of gas metering valves as second injection devices are arranged coaxially to a centrally arranged diesel injector as the first injection device, is described for example in German patent application DE 10 2013 022 260 B3.

Such dual-fuel injectors have holes and volumes, in particular blind holes and injection holes, from which, at the end of an injection process after the injector needle has closed, fuel can expand at low pressure into the combustion chamber where it is no longer or only partially combusted. This is a problem in particular with gaseous fuels which expand very greatly on expansion, and in particular with natural gas where this effect leads to a high methane slip.

SUMMARY OF THE INVENTION

The invention is based on the object of providing a dual-fuel injector, an internal combustion engine, and a method for operating an internal combustion engine, wherein said disadvantages do not occur. In particular, a loss of unburned hydrocarbons, in particular a methane slip, may be reduced in comparison with conventional dual-fuel injectors.

The object is achieved in particular in that a dual-fuel injector is created which comprises a first injection device for injecting a first fuel, and at least one second injection device, arranged radially outwardly from the first injection device, for injecting a second fuel, wherein the second fuel is different from the first fuel, and wherein a first port is provided for supplying the first fuel, and wherein a second port is provided for supplying the second fuel. Here it is provided that the first port is fluidically connected to the first injection device for supplying the gaseous first fuel, and the second port is fluidically connected to the second injection device for supplying the liquid second fuel. Thus in comparison with a known dual-fuel injector, the injection devices are exchanged in their function relative to the fuels. In particular, the gaseous fuel is no longer introduced radially outwardly through the at least one second injection device, but rather through the first injection device arranged radially inwardly relative to the at least one second injection device. Since typically a plurality of second injection devices are provided which are arranged radially outwardly from the first injection device and which have a plurality of blind holes, or an annular second injection device is provided with an annular blind hole, in particular a dead volume results from which fuel can expand and which is larger than a dead volume of a blind hole of the first injection device. If therefore the gaseous first fuel is supplied via the first injection device, the problem of the expanding gaseous fuel and the loss of unburned hydrocarbons exists only in relation to the comparatively small volume of the blind hole of the first injection device, whereas no such problem exists for the larger volume of the blind holes or blind hole of the second injection devices since liquid fuel is introduced through these.

The dual-fuel injector preferably has a linear extension and hence a longitudinal axis which defines an axial direction. A radial direction stands perpendicular to the longitudinal axis. A circumferential direction surrounds the longitudinal axis concentrically.

The term "radially outward" means in particular that the at least one second injection device—viewed in the longitudinal axis of the dual-fuel injector—is arranged at a greater radial distance from said axis than the first injection device.

The gaseous first fuel is preferably a substance which is gaseous and combustible under normal conditions, in particular at 25° C. and 1013 mbar, in particular is combustible in a combustion chamber of an internal combustion engine. Preferably, a methane-containing fuel is used as the gaseous first fuel, in particular natural gas, liquefied natural gas or compressed natural gas.

The liquid second fuel in particular is a substance which is liquid under normal conditions, in particular at 25° C. and 1013 mbar, wherein the substance is combustible, in particular combustible in a combustion chamber of an internal combustion engine. Preferably, the liquid second fuel is more easily combustible than the gaseous first fuel. In particular, the liquid second fuel is preferably an ignition oil, in particular diesel or dimethyl ether.

According to a refinement of the invention, it is provided that the first injection device is arranged centrally on the dual-fuel injector. Preferably, the first injection device is arranged centrally on the longitudinal axis of the dual-fuel injector, or coincides therewith. This gives a simple and compact design of the dual-fuel injector.

According to a refinement of the invention, it is provided that a plurality of second injection devices is arranged radially outwardly from the first injection device, in particular around the first injection device. Several outer second injection devices, and in particular the outer flow channels assigned thereto, in particular have the advantage that a larger surface area is provided relative to the fluid volume of the second fuel. Thus a better heat transmission and improved cooling of the dual-fuel injector is achieved. This applies quite particularly in connection with a liquid second fuel. In particular, it is possible that the second injection devices, viewed in the circumferential direction, lie on a theoretical common circle line around the first injection device, preferably at equal angular distances from each other. This gives a compact arrangement of second injection devices which is suitable for achieving a symmetrical spray pattern. Particularly preferably, three or four injection devices are arranged around the first injection device, in particular on a same theoretical circle line, i.e. at the same radial distance from the first injection device, and preferably at equal angular distances from each other, in particular thus in pairs with an angular spacing of 120° or 90° from each other.

It is possible that only one and precisely one second injection device is provided, arranged radially outwardly from the first injection device, which then preferably surrounds the centrally arranged first injection device in the manner of a ring, in particular coaxially. In this case, the second injection device in particular has an annular blind hole which also has a volume which is larger than a volume of the preferably central blind hole assigned to the first injection device.

According to a refinement of the invention, it is provided that the first and/or the second injection device has a nozzle needle with controllable axial stroke, a sealing seat and a blind hole downstream of the sealing seat, wherein the blind hole is fluidically connected to at least one injection bore. In a closed position, the nozzle needle lies tightly on the sealing seat and can be lifted away from the sealing seat into an open position by means of an axial stroke movement. In this case, fuel flows over the sealing seat into the blind hole and from there can pass via the at least one injection bore into a combustion chamber of the internal combustion engine. If the nozzle needle is arranged in its closed position, no further fuel can flow into the blind hole. In particular for a gaseous fuel however, a residual volume remains in the blind hole which is there compressed, in particular on a compression stroke of the internal combustion engine, and expands on an expansion stroke and thus overflows from the at least one injection bore into the combustion chamber. At this time, usually the conditions prevailing in the combustion chamber are such that the overflowing gaseous fuel is no longer burned. Therefore this is expelled together with the exhaust gas in an exhaust stroke, which leads to a loss of unburned hydrocarbons, in particular to a methane slip.

In the context of the invention, it has been found that the preferably centrally arranged blind hole of the first injection device has a smaller volume than a volume of a blind hole of the second injection device or a sum of the volumes of the decentrally arranged blind holes of the second injection devices, whereby the problem of loss of unburned hydrocarbons is reduced when the gaseous first fuel is injected by means of the first injection device instead of by the at least one second injection device.

According to a refinement of the invention, the dual-fuel injector has a plurality of second injection devices, wherein at least one second injection device of the second injection devices of the dual-fuel injector can be actuated separately. Here, separate actuation of the at least one second injection device means in particular that this can be actuated independently of every other second injection device. Particularly preferably, all second injection devices of the second injection devices of the dual-fuel injector can be actuated separately from each other. This gives advantages which are explained in more detail below in connection with the method.

The object is also achieved in that an internal combustion engine is created which comprises a dual-fuel injector according to any of the exemplary embodiments described above. The internal combustion engine also comprises a fuel gas supply device configured to supply the internal combustion engine with a gaseous first fuel. The internal combustion engine comprises a liquid fuel supply device configured to supply the internal combustion engine with a liquid second fuel. The fuel gas supply is fluidically connected to the first port of the dual-fuel injector. The liquid fuel supply device is fluidically connected to the second port of the dual-fuel injector. In this way, it is guaranteed that a gaseous first fuel is supplied to the first port which is fluidically connected to the first injection device, wherein a liquid second fuel is supplied to the second port which is fluidically connected to the second injection device. In connection with the internal combustion engine, particular advantages are achieved which have already been explained in connection with the dual-fuel injector.

The internal combustion engine is preferably configured as a reciprocating piston engine. It is possible that the internal combustion engine is configured to drive a car, a truck or a utility vehicle. In a preferred embodiment example, the internal combustion engine is used to drive in particular heavy land-based vehicles or watercraft, for example mining vehicles, ships or trains, wherein the internal combustion engine is used in a locomotive or a railcar. Also, use of the internal combustion engine for driving a military defense vehicle, in particular a tank, is possible. An exemplary embodiment of the internal combustion engine is preferably also stationary, in particular as a stationary energy supply for emergency power generation, continuous duty or peak load operation, wherein in this case, the internal combustion engine preferably drives a generator. A stationary use of the internal combustion engine for driving auxiliary systems, for example fire-extinguishing pumps on drilling platforms, is possible. Furthermore, use of the internal combustion engine in the field of transport of crude fossil materials and in particular fuels, for example oil and/or gas, is possible. Use of the internal combustion engine in the industrial sector or in the construction sector, for example in a construction or building machine, for example as a crane or an excavator, is possible. The internal combustion engine is preferably configured as a diesel engine, a petrol engine, a gas engine for operation with natural gas, biogas, special gas or another suitable gas. In particular, if the internal combustion engine is configured as a gas engine, it is suitable for use in a combined heat and power plant for stationary energy generation.

The object is also achieved in that a method is created for operating an internal combustion engine, wherein an internal combustion engine according to one of the exemplary embodiments described above is operated. In particular, the internal combustion engine accordingly comprises a dual-fuel injector according to one of the exemplary embodiments described above. Here, in connection with the method, in particular the advantages are achieved which have already been described in connection with the dual-fuel injector and the internal combustion engine.

According to a refinement of the invention, it is provided that at least one second injection device of a plurality of second injection devices of the dual-fuel injector is actuated separately. By separate actuation of at least one second injection device selected from a group of several second injection devices, advantages may be achieved in comparison with the known dual-fuel injectors in which all second injection devices are actuated in common. In particular, the injection or spray pattern for the second fuel may be varied as required with regard to the geometric introduction of the second fuel. In addition, advantages are achieved in relation to the thermal load on the combustion chamber and the dual-fuel injector, the wear on the second injection devices, and heat management in the combustion chamber, as will be explained in more detail below.

According to a refinement of the invention, it is provided that the second injection devices of a plurality of second injection devices are actuated alternately, in particular in successive working cycles of the internal combustion engine. In this way, the second fuel can be introduced alternately through different second injection devices. This firstly achieves a more precise metering, in particular if, in the preferred embodiment, only one of the second injection devices is actuated. The alternating introduction of the second fuel via different second injection devices allows a different thermal load on the combustion chamber, cylinder head and pistons in different regions in each working cycle. This can bring service life benefits.

In connection with a cooling of the dual-fuel injector, it has been found that introducing the liquid second fuel on the outside, via the at least one second injection device arranged radially outwardly, is advantageous since thus a liquid fuel flows through the dual-fuel injector in its radially outer region and cools this particularly efficiently.

An alternating actuation of the second injection devices is particularly favorable in relation to wear thereon, since the second injection devices not actuated in a working cycle are not loaded.

Finally, according to a refinement of the invention, it is provided that by separate actuation of at least one second injection device of the plurality of second injection devices, a particular geometric and/or temporal combustion situation is set in a combustion chamber of the internal combustion engine to which the dual-fuel injector is assigned. By targeted separate actuation of the second injection devices, namely a targeted geometric and/or temporal introduction of the second fuel into the combustion chamber can be achieved, and hence a targeted arrangement of the combustion therein. Thus different exhaust gas temperatures can be set so that an efficient heat management can be implemented for the internal combustion engine, in that the exhaust temperature is influenced by targeted choice of the combustion situation in the combustion chamber. By influencing the combustion situation in the combustion chamber, however, it is also possible to control the thermal load on the combustion chamber and homogenize this where possible, which has a positive effect on the performance and service life of the combustion chamber and hence the internal combustion engine as a whole.

The descriptions of the dual-fuel injector and the internal combustion engine firstly, and of the method secondly, should be understood as complementary to each other. Features of the dual-fuel injector and/or the internal combustion engine explained explicitly or implicitly in connection with the method are preferably individual or combined features of a preferred exemplary embodiment of the dual-fuel injector and/or internal combustion engine. Method steps which are explained explicitly or implicitly in connection with the dual-fuel injector or internal combustion engine are preferably individual or combined steps of a preferred embodiment of the method. This is distinguished preferably by at least one method step caused by at least one feature of a preferred exemplary embodiment of the dual-fuel injector and/or the internal combustion engine according to the invention. The internal combustion engine and/or the dual-fuel injector is/are distinguished preferably by at least one feature which is caused by at least one step of a preferred embodiment of the method according to the invention.

BRIEF DESCRIPTION OF THE DRAWING

The invention is explained below in more detail with reference to the drawing. The only FIGURE shows a diagrammatic depiction of an exemplary embodiment of an internal combustion engine with an exemplary embodiment of the dual-fuel injector.

DETAILED DESCRIPTION OF THE INVENTION

The only FIGURE shows a diagrammatic depiction of an internal combustion engine 1 with an exemplary embodiment of a dual-fuel injector 3. The dual-fuel injector 3 is assigned to a combustion chamber 5 and configured to supply two different fuels, in particular a gaseous first fuel and a liquid second fuel, to the combustion chamber 5.

For this, the dual-fuel injector 3 has a first injection device 7 which is configured to inject the first fuel, and at least one, here in total four, second injection device(s) 9 arranged radially outwardly from the first injection device 7 for injection of the second fuel into the combustion chamber 5, wherein in the sectional depiction of the FIGURE, of the four second injection devices 9, two second injection devices are shown, namely a first second injection device 9.1 and a second such injection device 9.2.

In the exemplary embodiment shown, the first injection device 7 is arranged centrally, i.e. in particular in the middle, and quite particularly on a longitudinal axis A of the dual-fuel injector 3 which defines an axial direction. The second injection devices 9 are spaced from the first injection device 7 in the radial direction and arranged radially outwardly, i.e. on a larger radius around the first injection device 7, in particular on a common circumferential line arranged concentrically to the longitudinal axis A, wherein the second injection devices 9 are preferably arranged at equal angular distances from each other. The first second injection device 9.1 and the second such injection device 9.2 here have an angular spacing of 180° from each other on the circumferential line. The two second injection devices not shown are preferably arranged, in the viewing direction of the observer, in front of the image plane and behind the image plane of the FIGURE, and also have an angular spacing of 180° from each other on the circumferential line, wherein an angular spacing of 90° on the circumferential line exists between pairs of adjacent second injection devices 9. The four second injection devices 9 are thus arranged at equal angular distances of 90° from each other on the theoretical circumferential line around the longitudinal axis A, and also arranged around the first injection device 7.

The dual-fuel injector 3 has a first port 11 for supplying the gaseous first fuel, and a second port 13 for supplying the liquid second fuel. The first port 11 is fluidically connected to the first injection device 7, and the second port 13 is fluidically connected to the second injection devices 9. Alternatively however, it is also possible that a separate second port 13 is assigned to each second injection device 9.

The first injection device 7 has a first nozzle needle 15 with controllable axial stroke, a first sealing seat 17 for the nozzle needle 15, a first blind hole 19 downstream of the sealing seat 17, and first injection bores 21 which are fluidically connected to the first blind hole 19 so that fuel can flow from the first blind hole 19 via the first injection bores 21 into the combustion chamber 5. The function of such an injection device is known in itself, so is not described in more detail here. It is merely stated that the first injection needle 15 may be actuated so as to execute a stroke movement in the axial direction from its assigned first sealing seat 17 into an open position, and be pressed into a closed position against the first sealing seat 17.

Similarly, second injection needles 23.1, 23.2, second sealing seats 25.1, 25.2, second blind holes 27.1, 27.2, and second injection bores 29.1, 29.2 are assigned to the second injection devices 9.

The internal combustion engine 1 has a fuel gas supply 31 which is configured to supply the gaseous first fuel to the internal combustion engine 1 and in particular to the combustion chamber 5, wherein the fuel gas supply 31 is fluidically connected to the first port 11 and thus also to the first injection device 7.

The internal combustion engine 1 also has a liquid fuel supply device 33 which is configured to supply the liquid second fuel to the internal combustion engine 1 and in particular to the combustion chamber 5, wherein the liquid fuel supply device 33 is fluidically connected to the second port 13 and in particular to the second injection devices 9.1, 9.2.

The various injection devices 7, 9 can here be actuated separately, i.e. in particular independently of each other. In particular, the second injection devices 9.1, 9.2 can be actuated separately, i.e. independently of each other.

For this, the internal combustion engine 1 has a control device 35 which is actively connected to the injection devices 7, 9 for separate, independent actuation thereof.

Here, it is preferably provided that the second injection devices 9.1, 9.2 are actuated alternately, in particular in successive working cycles of the combustion chamber 5. In addition or alternatively, it is preferably provided that a combustion situation in the combustion chamber 5 is set by separate actuation of at least one of the second injection devices 9.1, 9.2.

Because, with the dual-fuel injector 3 proposed here, the gaseous fuel is introduced into the combustion chamber 5 via the central first blind hole 19, wherein the first blind hole 19 has a smaller volume than the sum of the volumes of the second blind holes 27.1, 27.2, the problem of loss of unburned hydrocarbons and in particular methane slip on use of a methane-containing fuel gas by expansion of the fuel gas in an expansion stroke is significantly reduced or diminished.

Because the second injection devices 9.1, 9.2 are actuated separately and in particular preferably alternately, firstly an alternating thermal load on different regions of the combustion chamber can be achieved, and secondly a more precise metering of the liquid second fuel.

It has also been shown that the injection of the liquid second fuel radially on the outside of the dual-fuel injector 3 in principle leads to improved cooling thereof, since the liquid second fuel—which has a higher thermal capacity than the gaseous first fuel—is supplied close to the surface in the dual-fuel injector 3.

By separate actuation of the second injection device 9.1, 9.2 and an associated influencing of the geometric and/or temporal combustion situation in the combustion chamber 5, a heat management may be implemented for the internal combustion engine 1, wherein in particular different exhaust gas temperatures can be set.

Complex exhaust gas aftertreatment, which would otherwise be required because of a high loss of unburned hydrocarbons, for example a methane oxidation catalyst, may now be omitted. Instead, unburned fuel gas quantities can be supplied for combustion.

The invention claimed is:

1. A dual-fuel injector for an internal combustion engine, comprising:
    a first injection device for injecting a first fuel;
    at least one second injection device, arranged radially outwardly from the first injection device, for injecting a second fuel, wherein the first fuel is gaseous and the second fuel is liquid;
    a first port for supplying the first fuel; and
    a second port for supplying the second fuel, wherein
    the first port is fluidically connected to the first injection device for supplying the gaseous first fuel, and the second port is fluidically connected to the second injection device for supplying the liquid second fuel.

2. The dual-fuel injector according to claim 1, wherein the first injection device is arranged centrally on the dual-fuel injector.

3. The dual-fuel injector according to claim 1, wherein said at least one second injection device comprises a plurality of second injection devices is arranged around the first injection device.

4. The dual-fuel injector according to claim 1, wherein each of the injection devices has a nozzle needle with a controllable axial stroke, a sealing seat and a blind hole downstream of the sealing seat, wherein the blind hole is fluidically connected to at least one injection bore.

5. The dual-fuel injector according to claim 1, wherein said at least one second injection device comprises a plurality of second injection devices is provided, wherein at least one of the second injection devices is separately actuatable.

6. An internal combustion engine, comprising: a dual-fuel injector according to claim 1; a fuel gas supply device configured to supply the internal combustion engine with a gaseous first fuel; and a liquid fuel supply device configured to supply the internal combustion engine with a liquid second fuel, wherein the fuel gas supply device is fluidically connected to the first port of the dual-fuel injector, and the liquid fuel supply device is fluidically connected to the second port of the dual-fuel injector.

7. A method for operating an internal combustion engine, comprising the steps of:
    providing a dual-fuel injector having a first injection device for injecting a first fuel, at least one second injection device, arranged radially outwardly from the first injection device, for injecting a second fuel, wherein the first fuel is gaseous and the second fuel is liquid, a first port for supplying the first fuel, and a second port for supplying the second fuel, wherein the first port is fluidically connected to the first injection device for supplying the gaseous first fuel, and the second port is fluidically connected to the second injection device for supplying the liquid second fuel;
    supplying the gaseous first fuel to the first port of the dual-fuel injector using a fuel gas supply device; and
    supplying the liquid second fuel to the second port of the dual-fuel injector using a liquid fuel supply device.

8. The method according to claim 7, including separately actuating at least one second injection device of a plurality of the second injection devices.

9. The method according to claim 8, including alternately actuating the second injection devices.

10. The method according to claim 9, including actuating the second injection devices in successive working cycles of the internal combustion engine.

11. The method according to claim 7, wherein by separate actuation of the at least one second injection device of the second injection devices, a combustion situation is set in a combustion chamber of the internal combustion engine to which the dual-fuel injector is assigned.

* * * * *